United States Patent
Chi

(10) Patent No.: US 8,719,463 B2
(45) Date of Patent: May 6, 2014

(54) PROCESSOR WITH TIGHTLY COUPLED SMART MEMORY UNIT

(75) Inventor: Shyh-An Chi, Hsinchu (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 41 days.

(21) Appl. No.: 12/947,177

(22) Filed: Nov. 16, 2010

(65) Prior Publication Data

US 2012/0124248 A1    May 17, 2012

(51) Int. Cl.
*G06F 13/28* (2006.01)
*G06F 13/40* (2006.01)

(52) U.S. Cl.
USPC ............................................ 710/22; 395/444

(58) Field of Classification Search
USPC .......................................................... 710/22
See application file for complete search history.

(56) References Cited

U.S. PATENT DOCUMENTS

| | | | | |
|---|---|---|---|---|
| 5,584,010 A | * | 12/1996 | Kawai et al. | 711/117 |
| 5,717,952 A | * | 2/1998 | Christiansen et al. | 710/22 |
| 5,978,865 A | * | 11/1999 | Hansen et al. | 710/22 |
| 6,006,286 A | * | 12/1999 | Baker et al. | 710/22 |
| 6,081,852 A | * | 6/2000 | Baker | 710/24 |
| 6,807,614 B2 | | 10/2004 | Chung | |

OTHER PUBLICATIONS

Gschwind, Michael et al., "An Open Source Environment for Cell Broadband Engine System Software", IEEE Computer Society, Jun. 2007, pp. 37-47.

* cited by examiner

*Primary Examiner* — Titus Wong
(74) *Attorney, Agent, or Firm* — Lowe Hauptman & Ham, LLP

(57) ABSTRACT

An information processor includes a central processing unit core and a tightly coupled smart memory unit, the central processing unit core having a direct memory access unit. The tightly coupled smart memory unit having a memory unit coupled to the central processing unit core and a control register, and status register coupled to the central processing unit core and a local processing unit that processes data stored in the memory unit.

20 Claims, 7 Drawing Sheets

PROCESSOR WITH TIGHTLY COUPLED SMART MEMORY UNIT

BACKGROUND

The computing industry has a need for increased processing capacity with lower power consumption. One significant drain on power consumption and processing speed is caused by the transfer of data between memory and various processing units on common buses. Therefore, new architectures are required to reduce the amount of data transfer on common buses.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

A typical computer comprises a general purpose central processing unit (CPU) to perform logic and computation operations on data stored in a separate main memory. The instructions for performing the data operations are also stored in the main memory. The CPU has a CPU core that performs the logic and computation operations, and interface circuits to interface with the main memory and other circuits external to the CPU. For some logic, computation and information processing operations, the CPU core is not the optimum solution. Some operations require the manipulation of large amounts of data and therefore, require the CPU to read data constantly from the main memory and write the results back to the main memory. Other operations require specific complex tasks that are best carried out by hardware tailored to that operation, e.g., a floating point unit (FPU). Yet other operations require both manipulation of large data sets and specific complex tasks. Such operations require both hardware tailored to that operation and dedicated memory to store the data sets, e.g., a digital signal processor (DSP).

Some computers thus include an FPU and a DSP in addition to a CPU which manages the FPU and the DSP and requests the FPU and the DSP to perform operations when required. Some CPUs incorporate FPUs and DSPs in addition to the CPU core. A grouping of elements such as a CPU core, FPU or DSP for the purpose of this application is called an information processor (IP). An IP comprises one or more of a CPU core, FPU, DSP, cache memory or other specialized processing unit.

To complete some tasks, the work is divided between CPU core, FPU and DSP with the processing unit, i.e., CPU core, FPU, DSP, selected depending on the operation to be performed. Division of work in this manner requires that data be retrieved from the main memory or cache and transferred to the processing unit selected to perform the operation. After completion of the operation, the processing unit transfers the results back to the main memory or cache. The results required by the next operation are then transferable to the processing unit performing the next operation in the task. Thus, large amounts of data are transferred back and forth across a common bus interconnecting the different processing units, i.e., CPU core, FPU, and DSP, and the main memory or cache.

To facilitate these transfers between the various processing units and the main memory, direct memory access (DMA) units are used. These DMA units transfer blocks of data and instructions efficiently between the various processing units and the main memory or cache using the common bus, and are controlled by the CPU core. Even using DMA units, the transfer of data is still a significant overhead for data processing. Therefore, architectures that reduce this transfer of data across common data busses are desirable.

Figure 1:
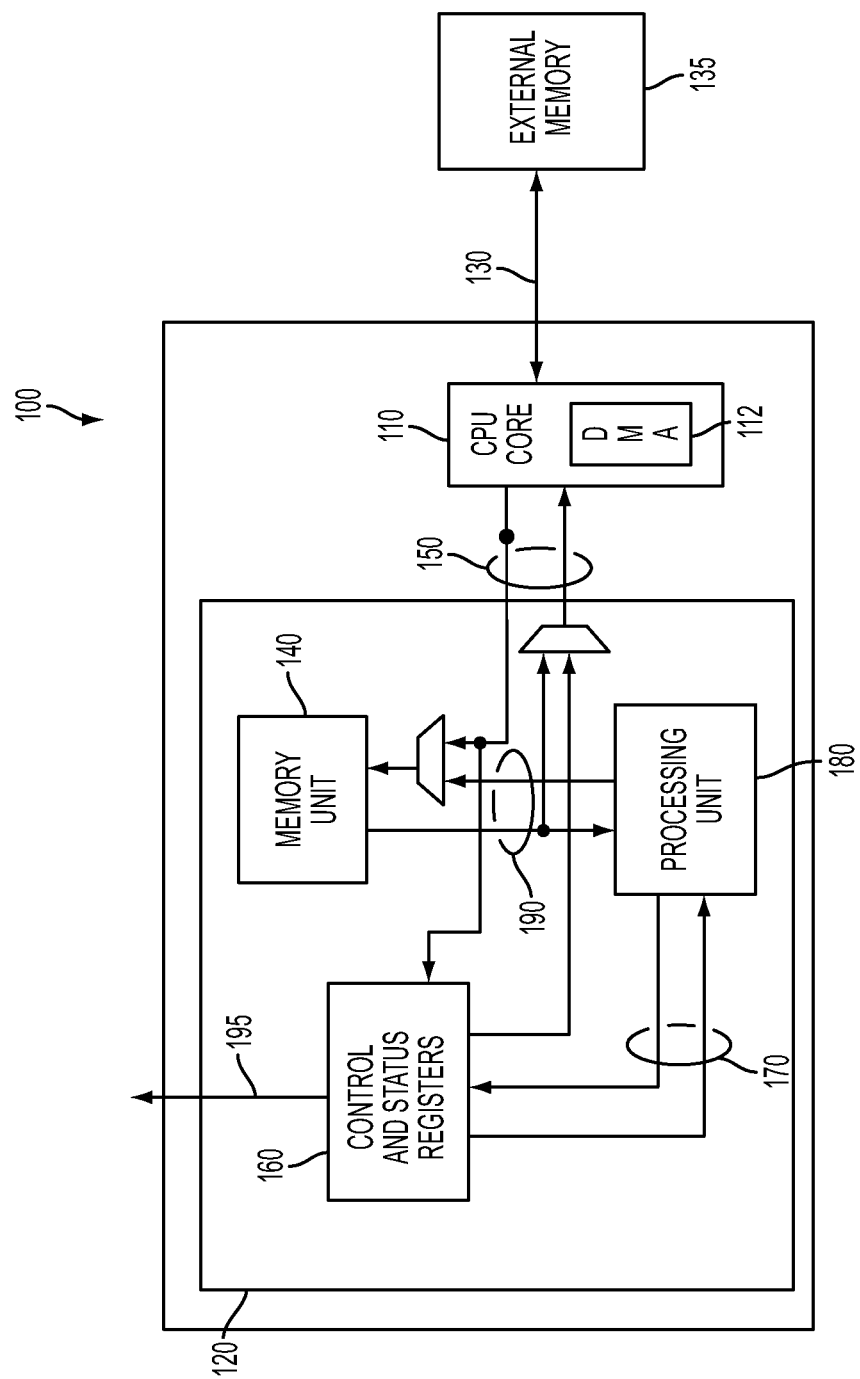
FIG. 1 is a high-level functional schematic diagram of a system with a smart tightly coupled memory according to an embodiment.

FIG. 1 is a high-level functional block diagram of an IP 100 that minimizes data transfer across a common bus and has high processing speed for complex tasks.

The IP 100 comprises a CPU core 110 that controls the IP 100. The CPU core 110 comprises a DMA unit 112 for direct memory access. The IP 100 further comprises a tightly coupled smart memory (TCSM) 120 that is directly connected to the CPU core 110 and the DMA unit 112 via a dedicated bi-directional bus 150 within the IP 100. In this manner, the TCSM 120 is tightly coupled to the CPU core 110 and the DMA unit 112. In some embodiments, a silicon chip has a single the IP 100 comprising the CPU core 110 and the tightly coupled smart memory 120. In other embodiments, a silicon chip has a number of IPs including at least one IP 100. These IPs form a system on chip (SoC), with different IPs optimized for performing different tasks such as cryptography, USB, DDR, Video and graphics. The CPU core 110 and DMA unit 112 are connected to other external components, for example external memory 135 and other IPs by an external common bi-directional bus 130.

The tightly coupled smart memory 120 comprises a memory unit 140 connected to the dedicated bus 150. The CPU core 110 either directly or by using the DMA unit 112 transfers the data to the memory unit 140 if data processing by the tightly coupled smart memory 120 is required. In some embodiments, the DMA unit 112 generates an interrupt upon completion of a given transfer of data. In some embodiments, the interrupt interrupts the CPU core 110. In some embodiments, the interrupt interrupts an external device.

The TCSM 120 comprises control and status registers 160 connected to the dedicated bus 150. The CPU core 110 writes one or more values to the control and status registers 160 to define the processing operations to be performed by the TCSM 120 on data transferred to the memory unit 140. The CPU core 110 reads one or more values from the control and status registers 160 to obtain the status of a given processing operations being performed or completed by the TCSM 120 on data transferred to the memory unit 140.

The TCSM 120 further comprises a local processing unit 180. The local processing unit 180 and the control and status registers 160 are the reason the TCSM is referred to as "smart" because the TCSM processes data as well as stores data. Control and status registers 160 control processing unit 180 using a connection 170. In some embodiments, connection 170 is a control bus. In other embodiments, connection 170 is a set of control lines. Upon receiving a command to execute from the control and status registers 160, the local processing unit 180 accesses the data stored in the memory unit 140 using a connection 190. In some embodiments, connection 190 is a bus. In other embodiments, connection 190 is a direct connection to row and column lines of the memory unit 140. The local processing unit 180 then executes processing operations on the data stored in the memory unit 140. After completion of the processing operations, the local processing unit 180 updates a status value of the control and status registers 160 using the connection 170.

In some embodiments, upon completion of an update of the control and status registers 160 by the local processing unit 180, the control and status registers 160 generate an interrupt on an interrupt line 195. In some embodiments, the interrupt is used to interrupt the CPU core 110 while in some other embodiments, the interrupt is used to interrupt a device external to the IP 100.

In some embodiments, the local processing unit 180 is a dedicated unit configured to perform a single set of operations on the data and is not reconfigurable to perform a different set of operations. In some embodiments, the local processing unit 180 performs one of a number of sets of operations the set of operations selected based on the configuration of the control and status registers 160. In some embodiments, the local processing unit 180 performs one of a number of sets of operations, the set of operations selected based on the data stored in the local memory 140. In some embodiments, the local processing unit 180 is reprogrammable and performs operations set by the CPU core 110 either directly via dedicated bus 150, via the control and status registers 160 and/or by storing the operations in the local memory 140 where the operations are retrieved by the local processing unit 180.

Figure 2:
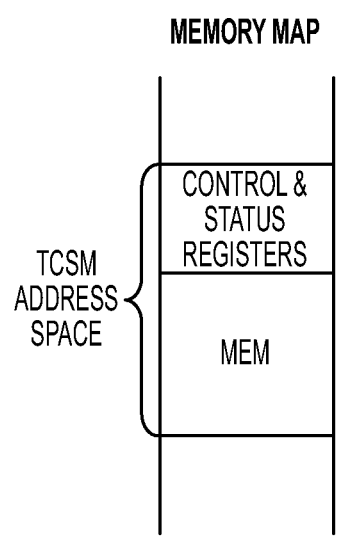
FIG. 2 is a an example of a memory map for the system shown in FIG. 1.

In some embodiments, the memory unit 140 and the status and control register 160 are memory mapped in the memory map of the CPU core 110 and DMA unit 112 so that the CPU core and DMA unit accesses the memory unit 140 and the status and control register 160 by directly addressing those units. FIG. 2 is a diagram of an example memory map for the IP in FIG. 1.

Figure 3:
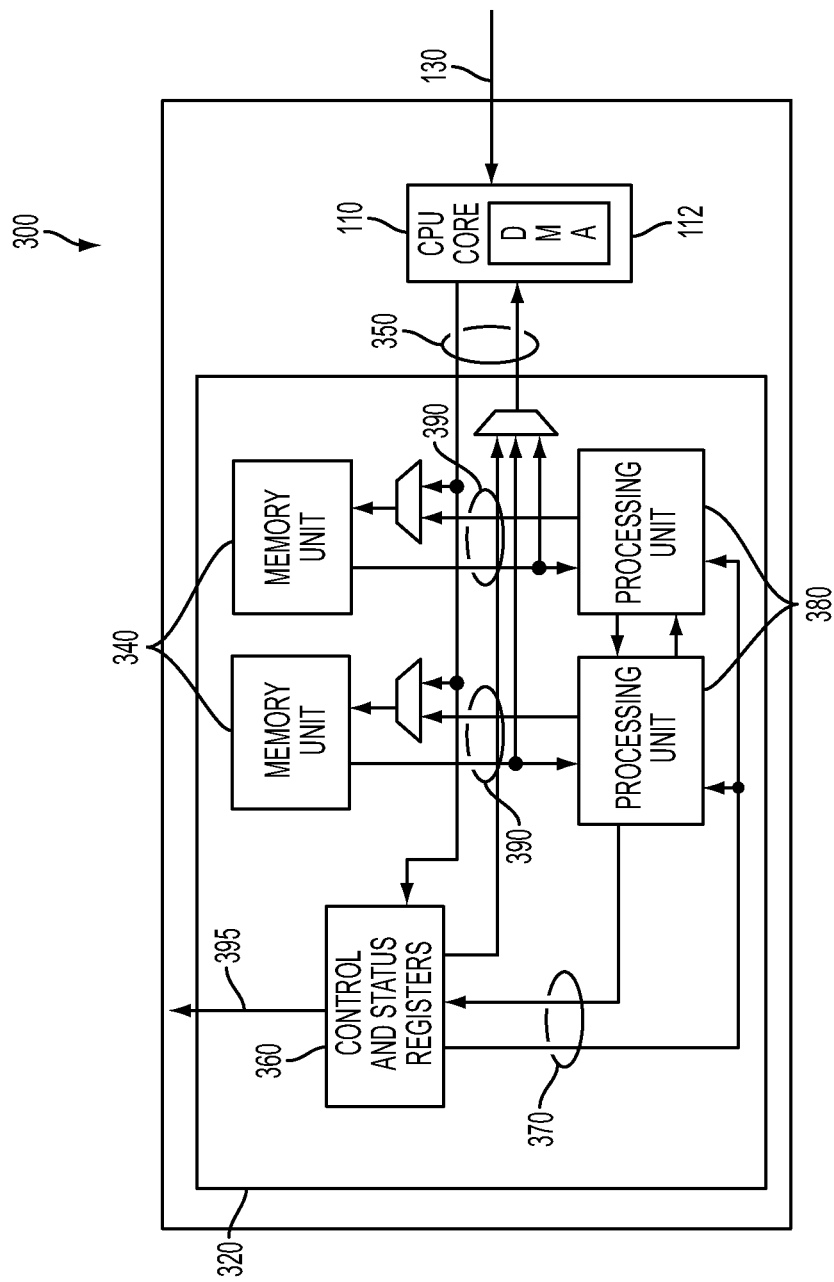
FIG. 3 is a high-level functional schematic diagram of a system with a smart tightly coupled memory according to an embodiment.

FIG. 3 is a high-level functional block diagram of an IP 300 comprising a TCSM 320 which further comprises multiple memory and local processing units. Similar units to the units in FIG. 1 have reference numbers increased by 200. TCSM 320 has multiple memory units 340. Each memory unit 340 has a corresponding local processing unit 380 that accesses data stored in the corresponding memory unit 340 via connections 390. Each of memory units 340 and corresponding processing units 380 can correspond to one or more of the embodiments discussed above with respect to memory units 140 and corresponding processing units 180. In some embodiments, the memory units 340 and corresponding processing units 380 are configurable separately using a status and control register 360 in similar manner to one or more of the embodiments discuss above with respect to memory units 140 and corresponding processing units 180. In some embodiments, the memory units 340 and corresponding processing units 380 are configurable to work in parallel. Thus, in some embodiments, one memory unit 340 and a corresponding processing unit 380 perform one set of operations while another memory unit 340 and corresponding processing unit 380 perform a different set of operations. In some embodiments, the processing units 380 are identical. In other embodiments, the processing units 380 are not identical, but specifically adapted to perform a particular operation. The CPU core 110 selects one of the processing units 380 based on the required set of operations. In some embodiments, the processing units 380 update the status and control register 360 after completion of a given processing operation.

Figure 4:
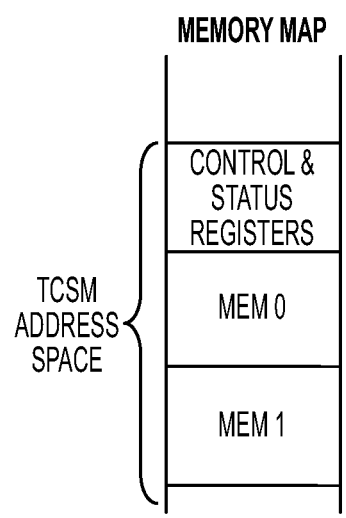
FIG. 4 is a an example of a memory map for the system shown in FIG. 3.

In some embodiments, the memory units 340 and the status and control register 360 are memory mapped in the memory map of the CPU core 110 and the DMA unit 112. FIG. 4 is a diagram of an example memory map for the IP 300 in FIG. 3 with a first of the memory units 340 mapped at MEM 0 and a second of the memory units 340 mapped at MEM 1.

Figure 5:
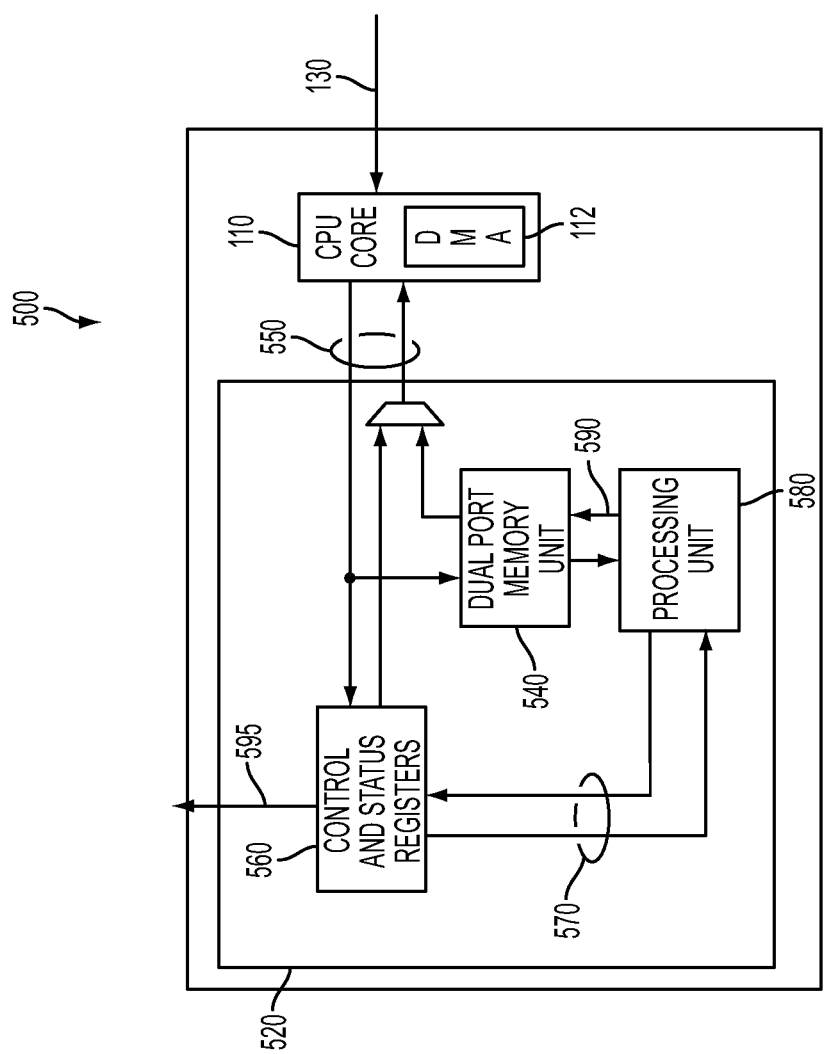
FIG. 5 is a high-level functional schematic diagram of a system with a smart tightly coupled memory according to an embodiment.

FIG. 5 is a high-level functional block diagram of an IP 500 comprising a TCSM 520 which further comprises a single dual-port memory and a processing unit. Similar units to the units in FIG. 1 have reference numbers increased by 400. TCSM 520 has a dual-port memory unit 540. The dual-port memory unit 540 has a corresponding local processing unit 580 that accesses data stored in the dual-port memory unit 540 via connections 590. A status and control register 560 controls the local processing unit 580 and stores the status of the local processing unit 580. The dual-port memory unit 540 and corresponding processing units 580 correspond to one or more of the embodiments discussed above with respect to memory units 140 and corresponding processing units 180. In some embodiments, the dual-port memory unit 540 is connected to the CPU core 110 and DMA unit 112 via a bus 550. The dual-port memory unit 540 is connected to the bus 550 via a first port and is connected to the processing unit 580 via a second port and connection 590. In some embodiments, the dual port memory is accessed by the CPU core 110 and DMA unit 112 at the same time as being accessed by processing unit 580. The dual port memory thus allows processing to begin or continue during the transfer of data from an external location to or from the TCSM 520.

Figure 6:
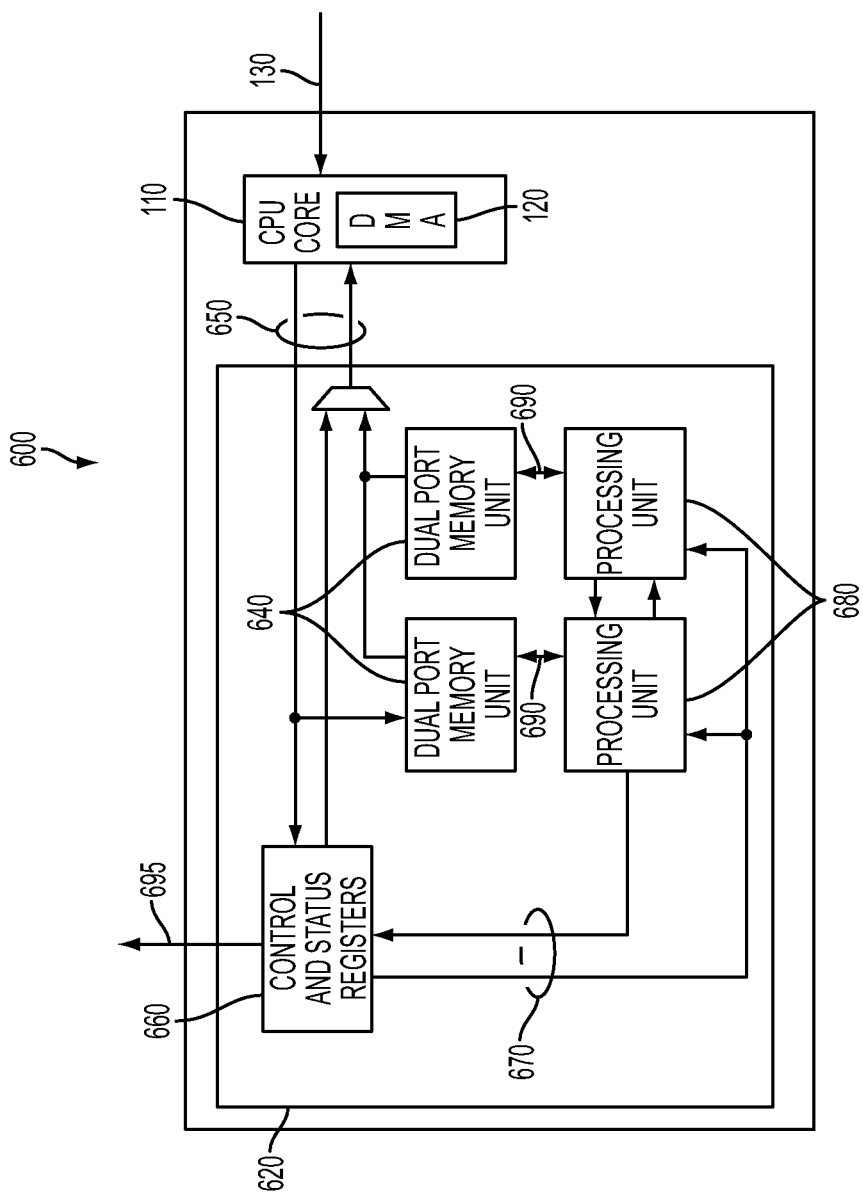
FIG. 6 is a high-level functional schematic diagram of a system with a smart tightly coupled memory according to an embodiment.

FIG. 6 is a high-level functional block diagram of an IP 600 comprising a TCSM 620 which further comprises multiple dual port memory and processing units. Similar units to the units in FIG. 1 have reference numbers increased by 500. In some embodiments, TCSM 620 has dual-port memory units 640. In some embodiments, each dual-port memory unit 640 has a corresponding local processing unit 680 that accesses data stored in the corresponding dual-port memory unit 640 via corresponding connections 690. A status and control register 660 controls each local processing units 680 and stores the status of each local processing unit 680. Each of dual-port memory units 640 and corresponding processing units 680 can correspond to the embodiments discuss above with respect to memory units 140 and corresponding processing units 180. In some embodiments, the dual-port memory units 640 and corresponding processing units 680 are configurable separately using a status and control register 660 in similar manner to one or more of the embodiments discussed above with respect to memory unit 140 and processing unit 180. In some embodiments, the dual-port memory units 640 and corresponding processing units 680 are configurable to work in parallel. Thus, in some embodiments, one dual-port memory unit 640 and a corresponding processing unit 680 performs one set of operations while another dual-port memory unit 640 and the corresponding processing unit 680 perform a different set of operations. In some embodiments, the processing units 680 update the status and control register 660 after completion of a given processing operation. In some embodiments, a dedicated bus 650 connects the dual-port memory units 640 to the CPU core 110 and DMA unit 112. The dual-port memory units 640 are connected to the bus 650 via corresponding first ports. The dual-port memory units 640 are connected to the corresponding processing unit 680 via a second port and connection 690. In some embodiments, the dual port memory is accessed by the CPU core 110 and DMA unit 112 at the same time as being accessed by corresponding local processing unit 680. The dual-port memory thus allows processing to begin or continue during the transfer of data from an external location to or from the TCSM 620.

Figure 7:
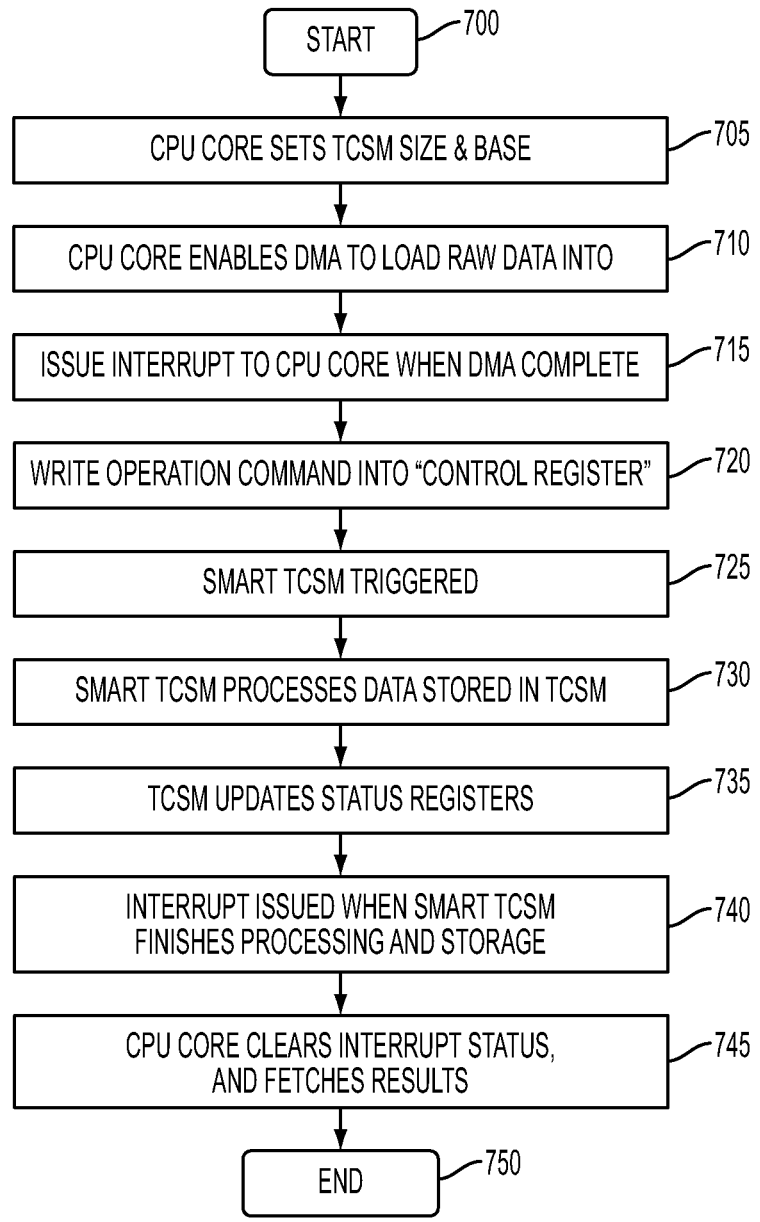
FIG. 7 is a flow diagram for a method of operating a smart tightly coupled memory according to an embodiment.

FIG. 7 is a flow chart for an embodiment of a method of operating a TCSM such as the TCSM 120 (FIG. 1). The method begins at step 700 and proceeds to step 705.

At step 705, the CPU core 110 sets parameters for a direct memory access from the external memory unit 135 to the memory unit 140 of TCSM 120 by setting one or more appropriate values in the DMA unit 112. In embodiments of a TCSM with multiple memory units, e.g., the embodiments of FIGS. 3 and 6, the CPU core 110 sets parameters in the DMA unit 112 for direct memory access either simultaneously, sequentially, or in an ad-hoc manner responsive to a need to use a particular local processor 380 or 680. In some embodiments, the parameters for a direct memory access include a base address for transferring the data and a memory size for transferring the data. The method then proceeds to step 710.

At step 710, in some embodiments, the CPU core 110 enables the DMA unit 112 to transfer data, using a DMA operation, based on the set parameters in step 705, from the external memory unit 135 to the memory unit 140. In some embodiments, the data transfer is via the dedicated bus 150. In embodiments of a TCSM with multiple memory units, e.g., the embodiments of FIGS. 3 and 6, the DMA unit 112 transfers, using DMA operations, data to multiple ones of the memory units 340 or 640. After completion of the DMA operations, the method proceeds to step 715.

In some embodiments, steps 705 and 710 are completed by the CPU core 110 without using the DMA unit 112, the CPU core transferring the data using the parameters for a direct memory access to determine the location in the external memory unit 135 and destination in the memory unit 140.

In step 715, the DMA unit 112 issues an interrupt to the CPU core 110 so that the CPU core proceeds with a next operation for data processing using TCSM 120. The interrupt allows the CPU core 110 to attend to other tasks during the execution of DMA operation. In some embodiments, the CPU core 110 polls the DMA unit 112 to detect completion of the DMA operation. Responsive to detection by the CPU core 110 of the end of the DMA operation, the method proceeds to step 720.

At step 720, the CPU core 110 writes control operations into the control and status register 160 of the TCSM and the method proceeds to step 725.

At step 725, the local processing unit 180 of the TCSM 120 is triggered by the completion of the writing of the control operations into the control and status register 160 of the TCSM. Next, the flow proceeds to step 730 wherein the local processing unit processes the data transferred to the memory unit 140, based on the control operation written at step 720 into the control and status register 160. In some embodiments, the processed data is stored by the local processing unit 180 in the memory unit 140. In some embodiments of a TCSM with multiple memory units, e.g., the embodiments of FIGS. 3 and 6, the local processing units 380 or 680 process data in the corresponding memory 340 or dual-port memory 640.

After the processing unit 180 completes processing the data in memory unit 140, the method proceeds to step 735.

At step 735, the processing unit 180 updates a status of the status and control register 160. In some embodiments, the status includes an indication of whether the processing completed successfully. However, any relevant status currently known or developed in the future can be included in the status. After the status is updated, the method proceeds to step 740.

At step 740, the status and control register 160 issues an interrupt indicating completion of the processing of step 730 and updating of step 735. In some embodiments, the interrupt is sent to the CPU core 110. In some embodiments, the interrupt is sent to a device external to the IP 100. In some embodiments, the CPU core 110 polls the status and control register 160 to detect the end of processing. Responsive to receipt of the interrupt by the CPU core 110, the method proceeds to step 745.

At step 745, the CPU core 110 clears the interrupt. In some embodiments, the CPU core instructs the DMA unit 112 to transfer the results of processing from the memory unit 140 to the external memory 135. In some embodiments, the CPU core 110 transfers or reads the results of processing from the memory unit 140. After completion of the transfer or reading of data from the TCSM 120, the method proceeds to step 750 where the method terminates. In embodiments of a TCSM with multiple memory units, e.g., the embodiments of FIGS. 3 and 6, the CPU core 110 fetches processed data, or causes the DMA unit 112 to transfer processed data from memory 340 or dual-port memory 640 for which processing is completed.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An information processor comprising:
a central processing unit core comprising a direct memory access unit; and
at least one tightly coupled smart memory unit, the at least one tightly coupled smart memory unit comprising:
a memory unit, directly coupled to at least one of the central processing unit core or the direct memory access unit;
a control register, directly coupled to the central processing unit core;
a status register, directly coupled to the central processing unit core;
a local processing unit adapted to process data stored in the memory unit, adapted to be controlled by the control register and adapted to update a status of the status register, wherein the local processing unit is separate from the central processing unit core and the direct memory access unit.

2. The information processor according to claim 1, the at least one tightly coupled smart memory unit coupled to at least one of the central processing unit core by a dedicated bus.

3. The information processor according to claim 1, the at least one tightly coupled smart memory unit further comprising an interrupt unit, adapted to interrupt the central processing unit core.

4. The information processor according to claim 1, the memory unit comprising a dual port memory unit including a first port, the first port directly connected to at least one of the central processing unit core or the direct memory access unit, and a second port directly connected to the local processing unit.

5. The information processor according to claim 1, the memory unit, the control register and the status register forming a portion of a memory map of the central processing unit core.

6. The information processor according to claim 1, the local processing unit adapted to store results of processing by the local processing unit in the memory unit.

7. The information processor according to claim 1, the direct memory access unit adapted to transfer the data for processing to the memory unit and results of processing by the local processing unit from the memory unit.

8. An information processor comprising:
- a central processing unit core comprising a direct memory access unit; and
- at least one tightly coupled smart memory unit, the at least one tightly coupled smart memory unit comprising:
- a plurality of memory units adapted to be accessed by at least one of the central processing unit core or the direct memory access unit;
- a control register adapted to be accessed by the central processing unit core;
- a status register adapted to be accessed by the central processing unit core;
- a plurality of local processing units, each local processing unit adapted to process data stored in a corresponding one of the plurality of memory units, adapted to be controlled by the control register and adapted to update a status of the status register, wherein each local processing unit is configured to receive instructions directly or indirectly from the central processing unit core or the direct memory access unit.

9. The information processor according to claim 8, the at least one tightly coupled smart memory unit further comprising an interrupt unit, adapted to interrupt the central processing unit core.

10. The information processor according to claim 8, each of the plurality of memory units comprising a dual port memory unit including a first port adapted to be accessed by at least one of the central processing unit core or the direct memory access unit, and a second port adapted to be accessed by the corresponding local processing unit.

11. The information processor according to claim 8, the plurality of memory units, the control register and the status register forming a portion of a memory map of the central processing unit core.

12. The information processor according to claim 8, the plurality of local processing units adapted to store results of processing in a corresponding memory unit.

13. A method of processing data comprising:
- a central processing unit core setting parameters for a direct memory access from an external memory unit to at least one local memory unit, the at least one local memory unit in a tightly coupled smart memory unit;
- a direct memory access unit transferring data, based on the set parameters, from the external memory unit to the at least one local memory unit;
- writing a control operation into a control register of the tightly coupled smart memory unit;
- a corresponding local processing unit of the tightly coupled smart memory unit processing the transferred data to the at least one local memory unit, based on the control operation in the control register;
- the corresponding local processing unit updating a status register of the tightly coupled smart memory unit, based on a result of processing the transferred data, wherein the corresponding local processing unit is separate from the central processing unit core and the direct memory access unit.

14. The method according to claim 13, the setting parameters for a direct memory access comprising setting a base address for transferring the data and setting a memory size for the transferring the data.

15. The method according to claim 13, the tightly coupled smart memory unit sending an interrupt to the central processing unit core upon completion of the data transfer.

16. The method according to claim 13, the tightly coupled smart memory unit sending an interrupt to the central processing unit core upon completion of the data processing.

17. The method according to claim 13, data transferred to the at least one local memory unit is performed via a dedicated bus.

18. The method according to claim 13, the at least one local memory unit comprising local dual port memory units, each of the local dual port memory units including a first port and a second port, the data transferred to each of the local dual port memory unit via the first port, the corresponding local processing unit accessing the data via the second port.

19. The method according to claim 13, the corresponding local processing unit storing the result of processing into the at least one local memory unit.

20. The information process according to claim 8, wherein each local processing unit is configured to receive the instructions via a dedicated bus, at least one of the plurality of memory units, the control register or the status register.

* * * * *